(12) United States Patent
Watanabe (10) Patent No.: US 8,822,825 B2
(45) Date of Patent: Sep. 2, 2014

(54) FOAMED ELECTRIC WIRE AND TRANSMISSION CABLE HAVING SAME

(75) Inventor: Ryo Watanabe, Chiba (JP)

(73) Assignee: Fujikura Ltd., Tokyo (JP)

( * ) Notice: Subject to any disclaimer, the term of this patent is extended or adjusted under 35 U.S.C. 154(b) by 46 days.

(21) Appl. No.: 13/343,189

(22) Filed: Jan. 4, 2012

(65) Prior Publication Data

US 2012/0138332 A1 Jun. 7, 2012

Related U.S. Application Data

(63) Continuation of application No. PCT/JP2010/061533, filed on Jul. 7, 2010.

(30) Foreign Application Priority Data

Jul. 7, 2009 (JP) .................................. 2009-161244

(51) Int. Cl.
| | | |
|---|---|---|
| H01B 3/44 | (2006.01) | |
| H01B 7/00 | (2006.01) | |
| C08J 9/06 | (2006.01) | |
| H01B 7/02 | (2006.01) | |

(52) U.S. Cl.
CPC ............. *C08J 9/06* (2013.01); *C08J 2323/10* (2013.01); *H01B 3/44* (2013.01); *C08J 2423/10* (2013.01); *C08J 2201/024* (2013.01); *H01B 7/02* (2013.01)
USPC ..................................... 174/110 F; 174/120 C (58) Field of Classification Search
USPC .......................................... 174/110 F, 120 C
See application file for complete search history.

(56) References Cited

U.S. PATENT DOCUMENTS

| | | | | |
|---|---|---|---|---|
| 4,826,899 A | * | 5/1989 | Rees | ............... 524/94 |
| 2002/0035210 A1 | * | 3/2002 | Silvestri et al. | .............. 525/240 |
| 2003/0055179 A1 | * | 3/2003 | Ota et al. | ....................... 525/242 |
| 2003/0124286 A1 | * | 7/2003 | Kijima | ......................... 428/36.9 |
| 2004/0062885 A1 | * | 4/2004 | Imanari et al. | .............. 428/34.1 |
| 2004/0168820 A1 | * | 9/2004 | Kanamori et al. | ....... 174/110 R |

(Continued)

FOREIGN PATENT DOCUMENTS

| | | |
|---|---|---|
| EP | 1 969 609 B1 | 3/2011 |
| JP | 63-072008 A | 4/1988 |

(Continued)

OTHER PUBLICATIONS

International Search Report of PCT/JP2010/061533, dated Oct. 12, 2010.

*Primary Examiner* — William H Mayo, III
*Assistant Examiner* — Rhadames J Alonzo Miller
(74) *Attorney, Agent, or Firm* — Sughrue Mion, PLLC (57) ABSTRACT

The foamed electric wire with a conductor and a foamed insulation layer covering the conductor; the foamed insulation layer is obtained by kneading a base resin composed of a high melting point propylene-based resin having a melting point of 150° C. or higher with a master batch containing a thermally decomposing chemical foaming agent and a low melting point propylene-based resin having a melting point of 135° C. or lower and melting the low melting point propylene-based resin followed by foaming by inducing thermal decomposition of the thermally decomposing chemical foaming agent, and a compounding ratio of the low melting point propylene-based resin in the entire resin component formed of the high melting point propylene-based resin and the low melting point propylene-based resin is less than 20% by mass.

6 Claims, 2 Drawing Sheets

(56) References Cited

U.S. PATENT DOCUMENTS

| | | | |
|---|---|---|---|
| 2004/0249009 A1* | 12/2004 | Homma et al. | 521/134 |
| 2005/0113473 A1* | 5/2005 | Wada | 521/143 |
| 2005/0131160 A1* | 6/2005 | Shimizu et al. | 525/242 |
| 2005/0165173 A1* | 7/2005 | Autran et al. | 525/333.7 |
| 2006/0051543 A1* | 3/2006 | Imanari et al. | 428/35.7 |
| 2007/0208140 A1* | 9/2007 | Wada | 525/240 |
| 2007/0251572 A1* | 11/2007 | Hoya et al. | 136/256 |
| 2008/0275148 A1* | 11/2008 | Tokiwa et al. | 521/51 |
| 2009/0145627 A1* | 6/2009 | Frigerio et al. | 174/110 PM |
| 2009/0163643 A1* | 6/2009 | Kiss et al. | 524/528 |
| 2010/0029827 A1* | 2/2010 | Ansems et al. | 524/451 |
| 2010/0105787 A1* | 4/2010 | Sasaki et al. | 521/59 |
| 2010/0130662 A1* | 5/2010 | Uehara et al. | 524/424 |
| 2011/0160324 A1* | 6/2011 | Yamada et al. | 521/134 |

FOREIGN PATENT DOCUMENTS

| | | |
|---|---|---|
| JP | 02-291605 A | 12/1990 |
| JP | 08-017255 A | 1/1996 |
| JP | 10-120835 A | 5/1998 |
| JP | 2003-002998 A | 1/2003 |
| JP | 2006-045268 A | 2/2006 |
| JP | 2007-131693 A | 5/2007 |
| JP | 2008-019379 A | 1/2008 |
| JP | 2009-520608 A | 5/2009 |
| WO | WO 2004053896 A1 * | 6/2004 |
| WO | WO 2007/071274 A1 | 6/2007 |

* cited by examiner

FOAMED ELECTRIC WIRE AND TRANSMISSION CABLE HAVING SAME

CROSS REFERENCE TO RELATED APPLICATIONS

This application is a Continuation of National Stage of International Application No. PCT/JP2010/061533 filed Jul. 7, 2010, claiming priority based on Japanese Patent Application No. 2009-161244 filed Jul. 7, 2009, the contents of all of which are incorporated herein by reference in their entirety.

TECHNICAL FIELD

The present invention relates to a foamed electric wire and a transmission cable having the same.

BACKGROUND ART

The foamed insulation layers of foamed electric wires used in high-speed transmission cables such as USB 3.0 cables, HDMI cables, InfiniBand cables or micro USB cables are required to have a narrow diameter, have high heat resistance and enable the formation of fine foam.

A foamed insulation layer obtained by melting a polypropylene-based resin and supplying a chemical foaming agent such as azodicarbonamide thereto followed by uniformly kneading is conventionally known to be such a foamed insulation layer (Patent Document 1).

PRIOR ART

Patent Document

Patent Document 1: Japanese Patent Application Laid-open No. 2006-45268

DISCLOSURE OF THE INVENTION

Problems to be Solved by the Invention

However, in the case of obtaining the foamed insulation layer described in the above-mentioned Patent Document 1, due to the high melting point of the propylene-based resin, the chemical foaming agent ends up decomposing and foaming prior to being uniformly kneaded during kneading of the propylene-based resin and the chemical foaming agent, thereby preventing the chemical foaming agent from being kneaded directly into the propylene-based resin.

Here, it can be considered to knead a propylene-based resin with a master batch containing a chemical foaming agent at a high concentration. At this time, if polyethylene is used for the resin of the master batch, since polyethylene has a low melting point, melting of the polyethylene occurs at a comparatively low temperature. Consequently, the chemical foaming agent does not decompose during kneading of the propylene-based resin with the master batch, and it is difficult for foaming to occur. On the other hand, if a propylene-based resin is used for the resin of the master batch, since propylene-based resins typically have a higher melting point than polyethylene, it is necessary to impart a high temperature to the master batch in order to melt the propylene-based resin. In this case, the chemical foaming agent decomposes and foaming ends up occurring in the same manner as directly kneading the chemical foaming agent into the propylene-based resin.

Thus, in the case of kneading a propylene-based resin with a master batch containing a chemical foaming agent at a high concentration, it is considered that there is no alternative but to use polyethylene, and particularly low-density polyethylene, for the resin of the master batch.

However, if polyethylene is used for the resin of the master batch, although sufficiently fine foam cells can be realized, since the heat resistance of the resulting foamed insulation layer decreases, the heat resistance of a foamed electric wire in which this is used also decreases.

With the foregoing in view, an object of the present invention is to provide a foamed electric wire allowing the obtaining of superior heat resistance while realizing sufficiently fine foam cells, and a transmission cable having this foamed electric wire.

Means for Solving the Problems

As a result of conducting extensive studies to solve the aforementioned problems, the inventors of the present invention found that the above-mentioned problems can be solved by using a low melting point propylene-based resin having a low melting point for the resin of the master batch, and making the compounding ratio of the low melting point propylene-based resin in the entire resin to be less than a prescribed value, thereby leading to completion of the present invention.

Namely, the present invention is a foamed electric wire provided with a conductor and a foamed insulation layer covering the conductor, wherein the foamed insulation layer is obtained by kneading a base resin formed of a high melting point propylene-based resin having a melting point of 150° C. or higher with a master batch containing a thermally decomposing chemical foaming agent and a low melting point propylene-based resin having a melting point of 135° C. or lower and melting the low melting point propylene-based resin, followed by foaming by inducing thermal decomposition of the thermally decomposing chemical foaming agent, and a compounding ratio of the low melting point propylene-based resin in the entire resin component formed of the high melting point propylene-based resin and the low melting point propylene-based resin is less than 20% by mass.

According to this foamed electric wire, superior heat resistance can be obtained while realizing sufficiently fine foam cells.

In the above-mentioned foamed electric wire, the compounding ratio of the low melting point propylene-based resin in the entire resin component formed of the high melting point propylene-based resin and the low melting point propylene-based resin is preferably 5% by mass or less. In this case, in comparison with the case of the compounding ratio being outside the above range, even more sufficiently fine foam cells can be realized and more superior heat resistance can be obtained.

In the above-mentioned foamed electric wire, the melt tension at break of the resin present in the foamed insulation layer is preferably 20 mN to 50 mN. If the melt tension at break of the resin in the foamed insulation layer is 20 mN or more, even more sufficiently fine foam cells can be realized. On the other hand, if the melt tension at break of the resin in the foamed insulation layer is 50 mN or less, there tends to be less susceptibility to a decrease in the degree of foaming when extruding the resin.

In the above-mentioned foamed electric wire, the base resin is preferably a copolymer of propylene and an α-olefin other than propylene, and this copolymer preferably contains a block copolymer. If the copolymer contains a block copolymer, in comparison with the case of not containing a block copolymer, even more sufficiently fine foam cells can be realized and more superior heat resistance can be obtained.

In addition, in the above-mentioned foamed electric wire, the outer diameter of the foamed insulation layer is preferably 1.6 mm or less.

In the above-mentioned foamed electric wire, the low melting point propylene-based resin is preferably a random copolymer of propylene and an α-olefin. In this case, there is the advantage of high heat resistance and high hardness in comparison with the case of the low melting point propylene-based resin not being a random copolymer of propylene and an α-olefin.

In addition, the present invention is a transmission cable having the above-mentioned foamed electric wire. According to this transmission cable, transmission loss can be reduced and superior heat resistance can be obtained.

Furthermore, in the present invention, "melt tension at break" refers to melt tension measured using a capillary rheometer (Capillograph 1D, Toyo Seiki Seisaku-sho, Ltd.), and more specifically, refers to the average value of the measured values of tension obtained by filling a resin into a flat capillary having an inner diameter of 1.0 mm and length of 10 mm, setting the capillary rheometer to measuring conditions consisting of a piston speed of 5 mm/min, barrel inner diameter of 9.55 mm, extracting acceleration of 400 m/min$^2$, and temperatures of the barrel, the capillary and the bath right behind the barrel of 200° C. each, followed by filling the resin into the barrel, starting piston extrusion at the above-mentioned piston speed after preheating for 5 minutes, extracting by accelerating at the above-mentioned extracting acceleration, measuring the tension at the time of breakage, and repeating measurement 10 times. Furthermore, the "resin" filled into the flat capillary or barrel refers to a mixed resin of a base resin and a resin contained in a master batch.

Effects of the Invention

According to the present invention, a foamed electric wire, which allows the obtaining of superior heat resistance while realizing sufficiently fine foam cells, and a transmission cable having that foamed electric wire, are provided.

MODE FOR CARRYING OUT THE INVENTION

Figure 1:
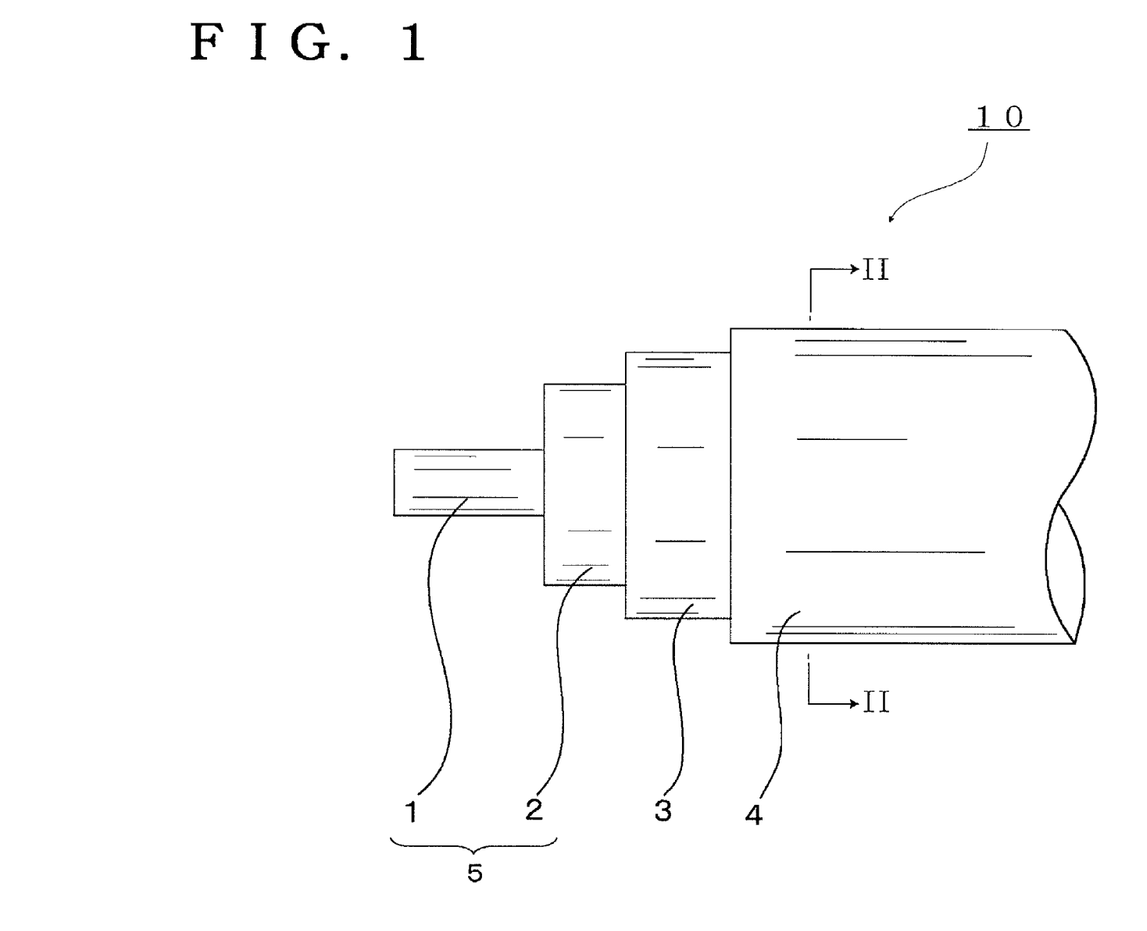
FIG. 1 is a partial side view showing an embodiment of a foamed electric wire of the present invention.
Figure 2:
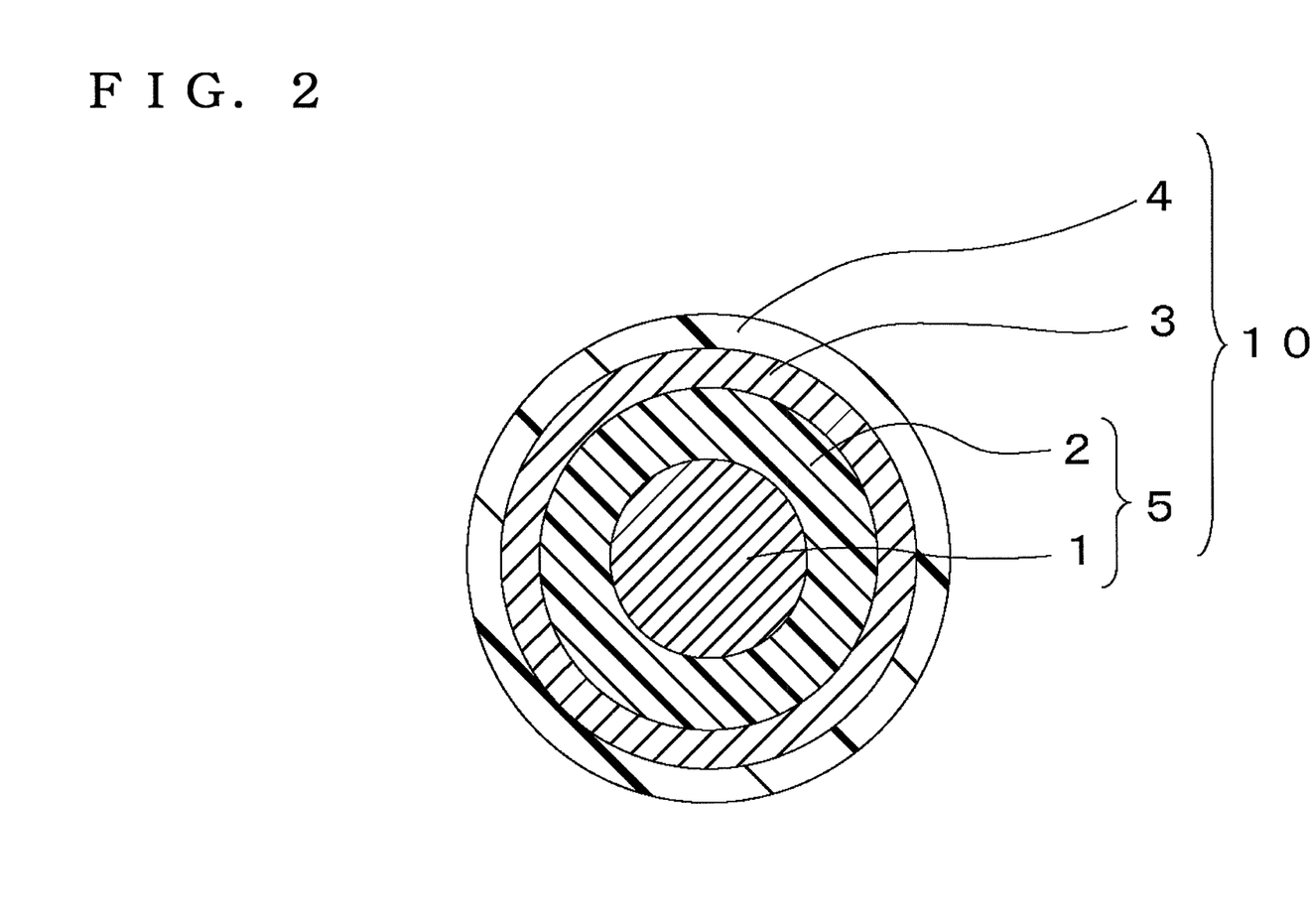
FIG. 2 is a cross-sectional view taken along line II-II in FIG. 1.

The following provides a detailed explanation of embodiments of the present invention using FIGS. 1 and 2.

FIG. 1 is a partial side view showing an embodiment of the foamed electric wire according to the present invention, and shows an example of applying a foamed electric wire to a coaxial cable serving as a transmission cable. FIG. 2 is a cross-sectional view taken along a line II-II in FIG. 1. As shown in FIG. 1, a transmission cable 10 indicates a coaxial cable, and is provided with a foamed electric wire 5, an external conductor 3 surrounding the foamed electric wire 5, and a sheath 4 covering the external conductor 3. The foamed electric wire 5 has an internal conductor 1 and a foamed insulation layer 2 covering the internal conductor 1.

Here, the foamed insulation layer 2 is obtained by kneading a base resin composed of a high melting point propylene-based resin having a melting point of 150° C. or higher with a master batch containing a thermally decomposing chemical foaming agent and a low melting point propylene-based resin having a melting point of 135° C. or lower and melting the low melting point propylene-based resin, followed by inducing foaming by causing thermal decomposition of the thermally decomposing chemical foaming agent. Here, the compounding ratio of the low melting point propylene-based resin in the entire resin component composed of the high melting point propylene-based resin and the low melting point propylene-based resin is less than 20% by mass.

According to the foamed electric wire 5 having this configuration, superior heat resistance can be obtained while realizing sufficiently fine foam cells.

Next, an explanation is provided of a production method of the transmission cable 10.

An explanation is first provided of a production method of the foamed electric wire 5.

(Internal Conductor)

The internal conductor 1 is first prepared. Examples of the internal conductor 1 include metal wire such as copper wire, copper alloy wire or aluminum wire. In addition, a metal wire the surface of which is plated with tin or silver and the like can also be used for the internal conductor 1. In addition, a single wire or twisted wire can be used for the internal conductor 1.

(Foamed Insulation Layer)

Next, the foamed insulation layer 2 is formed on the internal conductor 1.

In order to form the foamed insulation layer 2, a base resin composed of a high melting point propylene-based resin having a melting point of 150° C. or higher, and a master batch containing a thermally decomposing chemical foaming agent and a low melting point propylene-based resin having a melting point of 135° C. or lower, are prepared.

Here, an explanation is provided of the base resin.

The high melting point propylene-based resin refers to a propylene-based resin having a melting point of 150° C. or higher. Here, if the melting point is lower than 150° C., the heat resistance of the foamed electric wire 5 decreases considerably. In addition, the melting point of the high melting point propylene-based resin is preferably 155° C. or higher and more preferably 160° C. or higher. However, a temperature of 170° C. or lower is preferable for the melting point of the high melting point propylene-based resin for the reason that this enables a favorable balance to be maintained between low-temperature embrittlement resistance and bending resistance.

A propylene-based resin refers to a resin that contains a constitutional unit derived from propylene. Thus, examples of this propylene-based resin include homopolypropylene obtained by homopolymerization of propylene, copolymers of propylene and olefins other than propylene, and mixtures of two or more types thereof. Examples of olefins other than propylene include ethylene, 1-butene, 2-butene, 1-hexene and 2-hexene. In particular, α-olefins such as ethylene, 1-butene or 1-hexene are used preferably from the viewpoints of realizing sufficiently fine foam cells and obtaining superior heat resistance, while ethylene is used more preferably.

In the case the propylene-based resin is a copolymer of propylene and an olefin other than propylene, although the copolymer may contain a block copolymer or a random copolymer, the copolymer preferably contains a block copolymer. In comparison with the case of not containing a block copolymer, the containing of a block copolymer by the copolymer allows the obtaining of even more sufficiently fine foam cells and more superior heat resistance.

Here, although the copolymer may be composed of only a block copolymer or composed of a mixture of a block copolymer and a random copolymer, it is preferably composed of only a block copolymer. In this case, in comparison with the case of the copolymer being composed of a mixture of a block copolymer and a random copolymer, more sufficiently fine foam cells can be realized and more superior heat resistance can be obtained.

Next, an explanation is provided of the master batch.

The master batch contains a low melting point propylene-based resin and a thermally decomposing chemical foaming agent. The low melting point propylene-based resin refers to a propylene-based resin having a melting point of 135° C. or lower. Here, if the melting point exceeds 135° C., it becomes necessary to melt the propylene-based resin at a high temperature during the course of producing the master batch, thereby causing thermal decomposition of the chemical foaming agent. As a result, uneven foaming occurs in the resulting foamed insulation layer 2 and high-frequency characteristics decrease considerably. In addition, the melting point of the low melting point propylene-based resin is preferably 130° C. or lower and more preferably 127° C. or lower. However, making the melting point of the low melting point propylene-based resin to be 120° C. or higher is preferable from the viewpoint of facilitating handling during production.

Examples of this low melting point propylene-based resin include homopolypropylene obtained by homopolymerization of propylene and copolymers of propylene and an olefin other than propylene in the same manner as the high melting point propylene-based resin. Examples of this low melting point propylene-based resin also include mixtures of two or more types thereof. Examples of olefins other than propylene include ethylene, 1-butene, 2-butene, 1-hexene and 2-hexene. In particular, α-olefins such as ethylene, 1-butene or 1-hexene are used preferably from the viewpoints of increasing foam fineness and heat resistance, while ethylene is used more preferably.

In the case the low melting point propylene-based resin is a copolymer of propylene and an olefin other than propylene, although this copolymer may contain a block copolymer or a random copolymer, the copolymer preferably contains a random copolymer. If the copolymer contains a random copolymer, the melting point of the copolymer can be lowered more than in the case of not containing a random copolymer, and a master batch can be easily obtained that does not cause thermal decomposition of the thermally decomposing chemical foaming agent. In addition, superior low-temperature embrittlement resistance and bending resistance are also obtained.

Here, although the copolymer may be composed of only a random copolymer or a mixture of a random copolymer and a block copolymer, it is preferably composed only of a random copolymer. In this case, the melting point of the copolymer can be lowered further and more sufficiently fine foam cells can be realized and more superior heat resistance can be obtained in comparison with the case of the copolymer being composed of a mixture of a random copolymer and a block copolymer. Here, the low melting point propylene-based resin being a random copolymer of an α-olefin and propylene is more preferable from the viewpoint of heat resistance and maintaining a favorable balance between low-temperature embrittlement resistance and bending resistance.

The low melting point propylene-based resin can normally be obtained by using a metallocene catalyst as a catalyst during homopolymerization of propylene or copolymerization of propylene and another olefin.

The thermally decomposing chemical foaming agent is only required to be that which generates a gas such as $NH_3$, $N_2$ or $CO_2$ accompanying thermal decomposition, and examples thereof include azodicarbonamide (hereinafter referred to as "ADCA"), 4,4'-oxybisbenzenesulfonyl hydrazide, N,N'-dinitrosopentamethylene tetramine and azobisisobutyronitrile. In particular, azodicarbonamide is preferable since it has a high thermal decomposition temperature, further increases the difference between the melting point of the low melting point propylene-based resin and the thermal decomposition temperature, and is able to adequately inhibit thermal decomposition of the chemical foaming agent during the course of producing the master batch.

The content of the thermally decomposing chemical foaming agent in the master batch is 1% by mass to 40% by mass, preferably 2% by mass to 20% by mass, and more preferably 3% by mass to 15% by mass.

In order to obtain the master batch, the low melting point propylene-based resin and the thermally decomposing chemical foaming agent are introduced into an extruding machine and kneaded. In order to accomplish this, the low melting point propylene-based resin and the thermally decomposing chemical foaming agent are kneaded by heating to a temperature equal to or higher than the melting point of the low melting point propylene-based resin. However, if the thermally decomposing chemical foaming agent undergoes thermal decomposition during kneading, there is the risk of uneven foaming occurring in the foamed insulation layer 2. Consequently, kneading is preferably carried out at a temperature of 150° C. or lower. For example, in the case of using ADCA for the thermally decomposing chemical foaming agent, kneading is preferably carried out at a temperature of 130° C. to 145° C.

After having prepared the base resin and master batch in the manner previously described, the master batch and the high melting point propylene-based resin are kneaded. At this time, the compounding ratio of the low melting point propylene-based resin in the entire resin component composed of the high melting point propylene-based resin and the low melting point propylene-based resin is less than 20% by mass. This is because the heat resistance of the foamed electric wire 5 cannot be adequately improved if the compounding ratio is 20% by mass or more.

Here, the compounding ratio of the low melting point propylene-based resin in the entire resin component composed of the high melting point propylene-based resin and the low melting point propylene-based resin is preferably 5% by mass or less. In this case, foam cells can be made to be more sufficiently fine and more superior heat resistance can be obtained in comparison with the case of the compounding ratio being outside the above-mentioned range. However, the compounding ratio of the low melting point propylene-based resin is more preferably 2% by mass or more from the viewpoint of stable extrusion moldability.

In addition, in the case of kneading the master batch and the base resin, the low melting point propylene-based resin in the master batch is first melted. At this time, thermal decomposition of the thermally decomposing chemical foaming agent is avoided. After having uniformly dispersed the thermally decomposing chemical foaming agent in the resin in this manner, the thermally decomposing chemical foaming agent is allowed to be thermally decomposed by heating to a temperature equal to or higher than the thermal decomposition temperature to generate decomposition gas. Resin containing the decomposition gas is then foamed while extruding and the internal conductor 1 is covered with this extruded product. In this manner, the foamed insulation layer 2 is obtained on the internal conductor 1.

In the above-mentioned foamed electric wire 5, the melt tension at break of the resin in the foamed insulation layer 2 is preferably 20 mN or more for the reason that foam cells can be made to be more sufficiently fine, and is more preferably 25 mN or more. However, since the degree of foaming tends to decrease easily during resin extrusion if the melt tension at break of the resin is excessively large, the melt tension is preferably 50 mN or less and more preferably 35 mN or less.

Melt tension of the resin at break can be adjusted by adjusting the temperature of the resin at the die outlet of the extruding machine, for example.

In the case the foamed electric wire 10 is used in a high-frequency cable, the outer diameter of the foamed insulation layer 2 is preferably 1.6 mm or less and more preferably 1.0 mm or less.

Furthermore, the mean particle diameter of pellets of the base resin is normally 0.2 mm to 3 mm, preferably 0.5 mm to 1.5 mm, and more preferably 0.8 mm to 1.3 mm, the particle size distribution of the thermally decomposing chemical foaming agent preferably has a sharp particle size distribution, and the mean particle diameter of the thermally decomposing chemical foaming agent is preferably 3 µm to 10 µm. In this case, the foaming agent is uniformly dispersed in the base resin in the case of kneading the base resin and the master batch, and as a result thereof, fluctuations in outer diameter of the resulting foamed insulation layer 2 can be more adequately inhibited. This is particularly useful in the case the foamed insulation layer 2 of the foamed electric wire 5 has a narrow diameter of 1.6 mm or less.

(External Conductor)

Next, the external conductor 3 is formed so as to surround the foamed electric wire 5 obtained in the manner described above. A known conventionally used external conductor can be used for the external conductor 3. For example, the external conductor 3 can be formed by winding a lead wire, or a tape composed by interposing a conductive sheet between resin sheets along the outer periphery of the insulation layer 2. In addition, the external conductor 3 can also be composed with a corrugated metal tube, or in other words, a metal tube formed to have a wavy shape. In this case, the bendability of the foamed electric wire 5 can be improved.

(Sheath)

Finally, the sheath 4 is formed. The sheath 4 protects the external conductor 3 from physical or chemical damage, and although examples of the material that composes the sheath 4 include fluorine resin, polyethylene resin and polyvinyl chloride resin, a halogen-free material such as polyethylene resin is used preferably from the viewpoint of the environment and the like.

The transmission cable 10 is obtained in this manner.

Furthermore, the present invention is not limited to the above-mentioned embodiment. For example, although an example of applying the foamed electric wire 5 to a coaxial cable serving as a transmission cable is indicated in the previously described embodiment, the foamed electric cable 5 can also be applied to high-speed transmission cables such as USB 3.0 cables, HDMI cables, InfiniBand cables or micro USB cables.

EXAMPLES

Although the following provides a more detailed explanation of the contents of the present invention by listing examples and comparative examples, the present invention is not limited to the following examples. Furthermore, unit of the numerical values in Table 1 is percent by mass unless specifically indicated.

Example 1

An ethylene-propylene copolymer having a melting point of 165° C. (trade name: FB5100, manufactured by Japan Polypropylene Corp., hereinafter referred to as "EP polymer") was prepared for use as a base resin.

On the other hand, a random copolymer having a melting point of 125° C. (trade name: WFX4TC, manufactured by Japan Polypropylene Corp.) used as a master batch resin (MB resin) and azodicarbonamide (ADCA) used as a thermally decomposing chemical foaming agent were charged into an extruding machine (trade name: Labo Plastomill D2020, screw diameter (D): φ20 mm, effective screw length (L): 400 mm, manufactured by Toyo Seiki Seisaku-sho, Ltd.). At this time, the ADCA was added at 6 parts by mass to 100 parts by mass of the random copolymer. Melting and extrusion were then carried out under the following conditions, and the melt-extruded product was cut with a pelletizer to obtain master batch pellets. Furthermore, the WFX4TC used for the MB resin is a random copolymer of ethylene and propylene.

Kneading temperature: 140° C.

Screw speed: 20 rpm

The EP copolymer used for the base resin and the master batch were charged into a different extruding machine from that described above (screw diameter (D): φ25 mm, effective screw length (L): 800 mm, manufactured by Hijiri Manufacturing Ltd.) followed by carrying out extrusion molding. At this time, by setting an 80 mm portion of the extruding machine downstream from the inlet (to be referred to as the "first portion") to 160° C. and setting a 160 mm portion further downstream (to be referred to as the "second portion") to 190° C., the MB resin in the master batch was melted in the first portion followed by thermal decomposition of ADCA in the second portion. In addition, the compounding ratio of the MB resin to the entire resin component composed of the base resin and the MB resin in the master batch when the base resin and master batch were charged into the extruding machine was made to be as shown in Table 1.

The extruded product from the extruding machine was extruded into the shape of a tube, and a conductor having a diameter of 0.32 mm was covered with this tubular extruded product. In this manner, a foamed electric wire was fabricated composed of a conductor and a foamed insulation layer covering the conductor having an outer diameter of 0.92 mm and a thickness of 0.3 mm.

Example 2

A foamed electric wire was fabricated in the same manner as Example 1 with the exception of changing the compounding ratio of the base resin and MB resin as shown in Table 1.

Example 3

A foamed electric wire was fabricated in the same manner as Example 1 with the exception of changing the compounding ratio of the base resin and MB resin as shown in Table 1.

Example 4

A foamed electric wire was fabricated in the same manner as Example 1 with the exception of changing the MB resin from WFX4TC to WFW4 (trade name, manufactured by Japan Polypropylene Corp.) and obtaining the master batch by melting and extruding the MB resin and ADCA under the conditions indicated below.
Kneading temperature: 150° C.
Screw speed: 20 rpm Example 5

A foamed electric wire was fabricated in the same manner as Example 1 with the exception of changing the base resin from FB5100 to FB3312 which is an EP block copolymer (trade name, mp: 165° C., manufactured by Japan Polypropylene Corp.).

Example 6

A foamed electric wire was fabricated in the same manner as Example 1 with the exception of changing the base resin from FB5100 to a mixture of FB5100 and F227D (trade name, mp: 150° C., manufactured by Prime Polymer Co., Ltd.), which is an EP random copolymer, changing the compounding ratio of FB5100, EP random copolymer and MB resin to that shown in Table 1, and kneading the base resin and the master batch in the manner described below. Namely, kneading of the base resin and the master batch was carried out by setting the first portion of the extruding machine to 145° C., and setting the second portion located further downstream therefrom to 180° C. to melt the MB resin in the master batch in the first portion followed by thermally decomposing ADCA in the second portion.

Example 7

A foamed electric wire was fabricated in the same manner as Example 1 with the exception of changing the base resin from FB5100 to a mixture of FB5100 and F113G (trade name, mp: 165° C., manufactured by Prime Polymer Co., Ltd.) which is homopolypropylene, and changing the compounding ratio of the FB5100, homopolypropylene and MB resin to that indicated in Table 1.

Example 8

A foamed electric wire was fabricated in the same manner as Example 1 with the exception of changing the compounding ratio of the base resin and the MB resin to that shown in Table 1.

Comparative Example 1

A foamed electric wire was fabricated in the same manner as Example 1 with the exception of changing the base resin from FB5100 to high-density polyethylene (HDPE) having a melting point of 130° C., not using a master batch, adding ADCA at a ratio of 0.6 parts by mass to 100 parts by mass of the base resin, and kneading the base resin and the ADCA in the manner described below. Namely, kneading of the base resin and ADCA was carried out by setting the first portion of the extruding machine to 145° C., and setting the second portion located further downstream therefrom to 180° C. to melt the MB resin in the master batch in the first portion followed by thermally decomposing the ADCA in the second portion. Hizex® 5305E (trade name, manufactured by Mitsui Chemicals, Inc.) was used for the above-mentioned HDPE.

Comparative Example 2

A foamed electric wire was fabricated in the same manner as Example 1 with the exception of changing the MB resin from WFX4TC to low-density polyethylene (LDPE) having a melting point of 110° C. and changing the compounding ratio of the base resin and the MB resin to that indicated in Table 1. F522N (trade name, Ube Industries, Ltd.) was used for the above-mentioned LDPE.

Comparative Example 3

A foamed electric wire was fabricated in the same manner as Example 1 with the exception of changing the MB resin from WFX4TC to the HDPE used as a base resin in Comparative Example 1, and obtaining the master batch by melting and kneading the MB resin and ADCA under the conditions indicated below.
Kneading temperature: 150° C.
Screw speed: 20 rpm Comparative Example 4

A foamed electric wire was fabricated in the same manner as Example 1 with the exception of changing the compounding ratio of the base resin and the MB resin to that indicated in Table 1.

Comparative Example 5

A master batch was attempted to be fabricated in the same manner as Example 1 with the exception of changing the MB resin to the FB5100 used as a base resin in Example 1, and changing the kneading temperature of the MB resin and ADCA to 180° C. However, the ADCA in the master batch underwent thermal decomposition and foaming during the course of fabricating the master batch, thereby preventing the master batch from being fabricated, and resulting in the foamed electric wire being unable to be fabricated.

Comparative Example 6

A foamed electric wire was fabricated in the same manner as Example 1 with the exception of changing the compounding ratio of the base resin and the MB resin to that indicated in Table 1.

[Evaluation of Properties]

The following properties were evaluated for the foamed electric wires obtained in Examples 1 to 8 and Comparative Examples 1 to 4 and 6. Furthermore, Comparative Example 5 was not targeted for evaluation of properties since a foamed insulation layer was unable to be fabricated.

(1) Melt Tension at Break

Melt tension at break was measured in the manner described below for the foamed electric wires obtained in Examples 1 to 8 and Comparative Examples 1 to 4 and 6.

Namely, melt tension was measured using a capillary rheometer (Capillograph 1D, manufactured by Toyo Seiki Seisaku-sho, Ltd.). More specifically, resin was filled into a flat capillary having an inner diameter of 1.0 mm and length of 10 mm, and the capillary rheometer was set to measuring conditions consisting of a piston speed of 5 mm/min, barrel inner diameter of 9.55 mm, extracting acceleration of 400 m/min$^2$, and temperatures of the barrel, the capillary and the bath right behind the barrel of 200° C. each, followed by filling the resin into the barrel, starting piston extrusion at the above-mentioned piston speed after preheating for 5 minutes, extracting by accelerating at the above-mentioned extracting acceleration, measuring the tension at the time of breakage, and calculating the average value of the measured values of tension obtained by repeating measurement 10 times. The results are shown in Table 1. Furthermore, the "resin" filled into the flat capillary or barrel refers to a mixed resin of a base resin and a resin contained in a master batch.

(2) Average foam Cell Diameter

A portion of the foamed insulation layer was cut out from the foamed electric wires of Examples 1 to 8 and Comparative Examples 1 to 4 and 6, and a cross-section of the foamed insulation layer was observed using a scanning electron microscope. Cell diameter was measured based on the following equation for each of 100 randomly selected foam cells.

$$\text{Cell diameter} = (\text{max. cell diameter} + \text{min. cell diameter})/2 \quad \text{[Equation 1]}$$

The average value of the cell diameters of 100 foam cells was calculated as "average foam cell diameter". The results are shown in Table 2. Furthermore, in Table 2, foamed electric wires having a foamed insulation layer in which the average foam cell diameter is less than 40 μm were evaluated as acceptable, while foamed electric wires having a foamed insulation layer in which the average foam cell diameter is 40 μm or more were evaluated as unacceptable.

(3) Heat Resistance

Heat resistance was evaluated for the foamed electric wires of Examples 1 to 8 and Comparative Examples 1 to 4 and 6 by carrying out a heat deformation test. The heat deformation test was carried out by using a heat deformation tester (3-piece Heat Distortion Tester mold number W-3) manufactured by Toyo Seiki Seisaku-sho, Ltd. More specifically, foamed electric wire cut to a length of 5 cm was placed on a cylindrical jig having a diameter of 9 mm and length of 5.0 mm and preheating for 1 hour, followed by applying a load of 250 g over the course of 1 hour with the foamed electric wire heated to 121° C. while pressing the foamed electric wire onto the cylindrical jig. The thermal deformation rate was measured in this manner, and the acceptance level attainment rate of the thermal deformation rate was calculated according to the following equation based on this heat deformation rate.

$$\text{Acceptance level attainment rate of heat deformation rate (\%)} = \text{acceptance level of heat deformation rate (\%)}/\text{heat deformation rate (\%)} \times 100 \quad \text{[Equation 2]}$$

Here, the acceptance level of thermal deformation rate was set at 12%. Namely, the acceptance level attainment rate of the heat deformation rate becomes 100% or more for foamed electric wires in which the heat deformation rate is 12% or less, and such foamed electric wires were evaluated as acceptable since heat resistance had improved. In addition, the acceptance level attainment rate of the heat deformation rate is less than 100% for foamed electric wires in which the heat deformation rate exceeds 12%, and such foamed electric wires were evaluated as unacceptable since heat resistance did not adequately improve. The results are shown in Table 2. Furthermore, heat deformation rate was calculated according to the following equation:

$$\text{heat deformation rate (\%)} = (Tb - Ta)/Tb \times 100 \quad \text{[Equation 3]}$$

(wherein, Tb represents the thickness of the foamed insulation layer prior to heat deformation testing, and Ta represents the thickness of the foamed insulation layer after heat deformation testing).

(4) Outer Diameter Fluctuation Width

The maximum and minimum values of outer diameter were measured for foamed electric wires having a length of 2000 m obtained in Examples 1 to 8 and Comparative Examples 1 to 4 and 6 using an outer diameter measuring instrument (Keyence Corp., manufactured by High-Speed High-Precision Digital Micrometer LS-7000 Series), and outer diameter fluctuation width was calculated according to the following equation.

$$\text{Outer diameter fluctuation width} = \text{outer diameter max. value} - \text{outer diameter min. value} \quad \text{[Equation 4]}$$

The results are shown in Table 2.

(5) VSWR (Voltage Standing Wave Ratio)

After covering the foamed electric wires obtained in Examples 1 to 8 and Comparative Examples 1 to 4 and 6 with an external conductor composed of tin-plated braiding, the external conductor was extrusion coated with a sheath composed of the olefin-based non-halogen material, ANA9897N (trade name, manufactured by Riken Technos Corp.) to fabricate a coaxial cable. The coaxial cable obtained in this manner was then cut to prepare ten 3-meter coaxial cables. VSWR values were then measured for the 10 coaxial cables using the Network Analyzer 8722ES (trade name, manufactured by Agilent Technologies, Inc.), followed by calculation of the average value of those measured values. At this time, the frequency range was set to 100 MHz to 5 GHz. The results are shown in Table 2.

(6) Skew

Two of the foamed electric wires obtained in Examples 1 to 8 and Comparative Examples 1 to 4 and 6 were arranged in parallel, and wound along with a drain wire with laminating tape having a thickness of 22 μm composed of a laminate consisting of an aluminum layer and a polyethylene terephthalate layer. Next, this was wound together with two power lines having an outer diameter of 0.8 mm with an aluminum tape layer having a thickness of 25 μm followed by covering with a braided layer and additionally covering with a sheath composed of olefin-based non-halogen material, ANA9897N (trade name, manufactured by Riken Technos Corp.). A Twinax type of transmission cable was fabricated in this manner. The transmission cable obtained in this manner was then cut to prepare ten 2 m transmission cables. Skew was measured for these ten transmission cables using the TDR TDS8000 (trade name, manufactured by Tektronics Japan, Ltd.), followed by calculation of the average value thereof. The results are shown in Table 2.

(7) Degree of Foaming

Degree of foaming was calculated based on the equation below.

$$\text{Degree of foaming (\%)} = [1 - (\text{specific gravity of foamed insulation layer after foaming}/\text{specific gravity of resin before foaming})] \times 100 \quad \text{[Equation 5]}$$

As a result, the degree of foaming was 40% in all of the foamed insulation layers of the foamed electric wires of Examples 1 to 8 and Comparative Examples 1 to 4 and 6. Here, the "resin before foaming" refers to the mixed resin of the base resin and the MB resin prior to charging into the extruding machine or the base resin.

TABLE 1

| | Base Resin | | | | | MB Resin | | | | | |
|---|---|---|---|---|---|---|---|---|---|---|---|
| | EP Copolymer | | HomoPP | HDPE Hizex | | EP Copolymer | | HDPE Hizex | PE | | |
| | Block | Random | | | | Random | Block | | | LDPE | Melt tension at break (mN) |
| | FB5100 mp 165° C. | FB3312 mp 165° C. | F227D mp 150° C. | F113G mp 165° C. | 5305E mp 130° C. | WFX4TC mp 125° C. | WFW4 mp 135° C. | FB5100 mp 165° C. | 5305E mp 130° C. | F522N mp 110° C. | |
| Ex. 1 | 90 | | | | | 10 | | | | | 40 |
| Ex. 2 | 95 | | | | | 5 | | | | | 45 |
| Ex. 3 | 82 | | | | | 18 | | | | | 36 |
| Ex. 4 | 90 | | | | | | 10 | | | | 40 |
| Ex. 5 | | 90 | | | | 10 | | | | | 35 |
| Ex. 6 | 50 | | 40 | | | 10 | | | | | 23 |
| Ex. 7 | 45 | | | 45 | | 10 | | | | | 21 |
| Ex. 8 | 97 | | | | | 3 | | | | | 45 |
| Comp. Ex. 1 | | | | | 100 | | | | | | 18 |
| Comp. Ex. 2 | 80 | | | | | | | | | 20 | 40 |
| Comp. Ex. 3 | 80 | | | | | | | | 20 | | 40 |
| Comp. Ex. 4 | 80 | | | | | 20 | | | | | 35 |
| Comp. Ex. 5 | 70 | | | | | | | 20 | | | 40 |
| Comp. Ex. 6 | 70 | | | | | 30 | | | | | 30 |

TABLE 2

| | Results | | | | |
|---|---|---|---|---|---|
| | Foamed Insulation Layer | | | Transmission Cable | |
| | | | Acceptance level | | |
| | Average foam cell diameter (μm) | External diameter fluctuation width (μm) | attainment rate of heat deformation rate (%) | Coaxial Cable VSWR 100 MHz to 5 GHz [-] | Double-core parallel wire Skew (ps/m) |
| Ex. 1 | 19 | 35 | 120 | 1.10 | 9 |
| Ex. 2 | 15 | 38 | 171 | 1.12 | 10 |
| Ex. 3 | 22 | 27 | 100 | 1.06 | 7 |
| Ex. 4 | 19 | 35 | 133 | 1.10 | 9 |
| Ex. 5 | 23 | 35 | 120 | 1.10 | 9 |
| Ex. 6 | 32 | 35 | 100 | 1.10 | 9 |
| Ex. 7 | 36 | 35 | 120 | 1.10 | 9 |
| Ex. 8 | 15 | 42 | 200 | 1.15 | 12 |
| Comp. Ex. 1 | 40 | 12 | 34 | 1.02 | 3 |
| Comp. Ex. 2 | 19 | 27 | 48 | 1.07 | 8 |
| Comp. Ex. 3 | 19 | 28 | 80 | 1.07 | 8 |
| Comp. Ex. 4 | 23 | 25 | 92 | 1.05 | 6 |
| Comp. Ex. 5 | Foaming during MB fabrication preventing fabrication of MB (unable to form foamed insulation layer) | | | | |
| Comp. Ex. 6 | 26 | 21 | 80 | 1.04 | 5 |

According to the results of Table 2, the average foam cell diameter of all of the foamed electric wires of Examples 1 to 8 and Comparative Examples 2 to 4 and 6 was less than 40 μm. In contrast, the average foam cell diameter of the foamed electric wire of Comparative Example 1 was 40 μm or more. In addition, the foamed electric wires of Examples 1 to 8 demonstrated acceptance level attainment rates for heat deformation rate of 100% or more, while the foamed electric wires of Comparative Examples 1 to 4 and 6 demonstrated acceptance level attainment rates for heat deformation rate of less than 100%. On the basis of these findings, it was found that the foamed electric wires of Examples 1 to 8 were able to realize sufficiently fine foam cells and had adequate heat resistance in comparison with the foamed electric wires of Comparative Examples 1 to 4 and 6.

Furthermore, foamed electric wires of Examples 1 to 8 and Comparative Examples 1 to 4 and 6 all demonstrated favorable results for VSWR measured for a coaxial cable and skew measured for a double-core parallel wire.

On the basis of the above, the foamed electric wire of the present invention was confirmed to be able to allow the obtaining of superior heat resistance while being able to realize sufficiently fine foam cells.

EXPLANATION OF REFERENCE NUMERALS

1 Internal conductor (conductor), 2 Foamed insulation layer, 5 Foamed electric wire.

The invention claimed is:
1. A foamed electric wire, comprising:
a conductor; and
a foamed insulation layer covering the conductor, wherein the foamed insulation layer is obtained by:

kneading a base resin formed of a high melting point propylene-based resin having a melting point of 150° C. or higher with a master batch containing a thermally decomposing chemical foaming agent and a low melting point propylene-based resin having a melting point of 125° C. or higher and 135° C. or lower and being a random copolymer, and melting the low melting point propylene-based resin, followed by foaming by inducing thermal decomposition of the thermally decomposing chemical foaming agent; and a compounding ratio of the low melting point propylene-based resin in the entire resin component formed of the high melting point propylene-based resin and the low melting point propylene-based resin is less than 20% by mass.

2. The foamed electric wire according to claim 1, wherein the compounding ratio of the low melting point propylene-based resin in the entire resin component formed of the high melting point propylene-based resin and the low melting point propylene-based resin is 5% by mass or less.

3. The foamed electric wire according to claim 1, wherein a melt tension at break of the resin present in the foamed insulation layer is 20 mN to 50 mN.

4. The foamed electric wire according to claim 1, wherein the base resin is a copolymer of propylene and an α-olefin other than propylene, and this copolymer contains a block copolymer.

5. The foamed electric wire according to claim 1, wherein the outer diameter of the foamed insulation layer is 1.6 mm or less.

6. A transmission cable having the foamed electric wire according to claim 1.

* * * * *